May 4, 1943.　　　　R. C. WITTMAN　　　　2,318,550
TRACTOR WHEEL ADAPTER
Filed Jan. 24, 1942
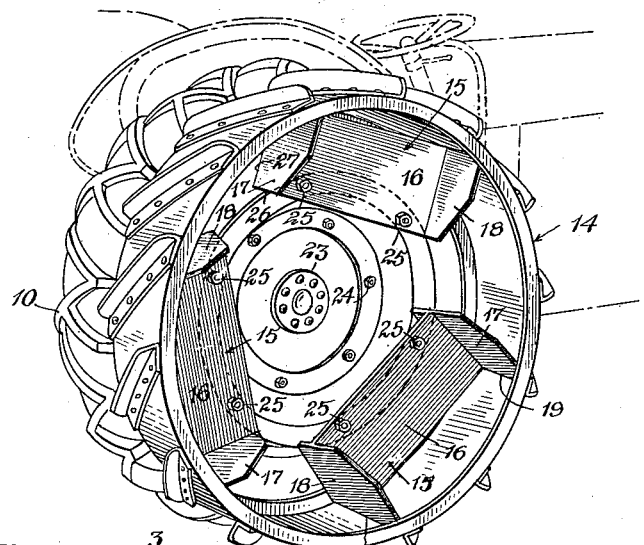
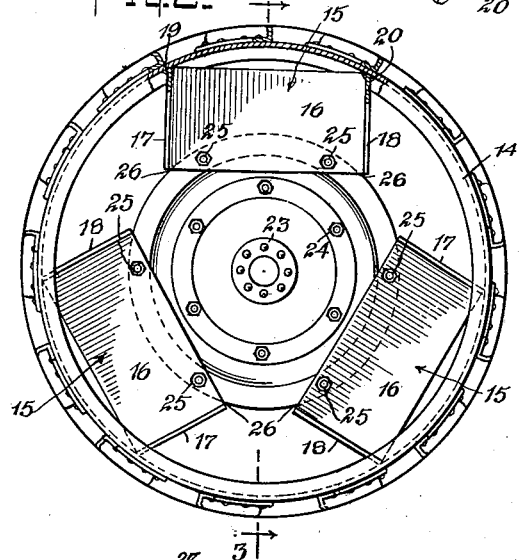
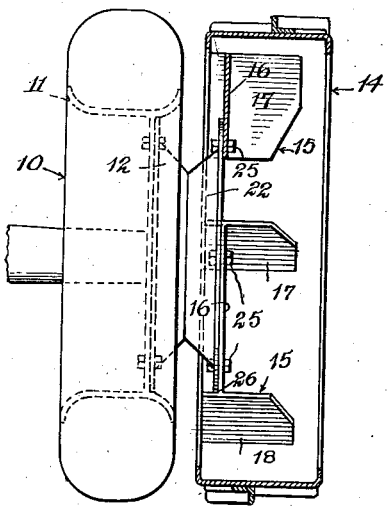
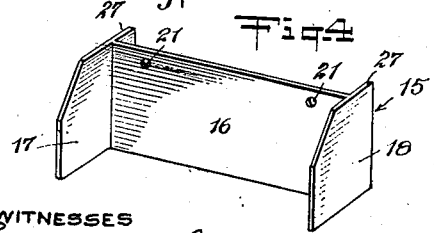
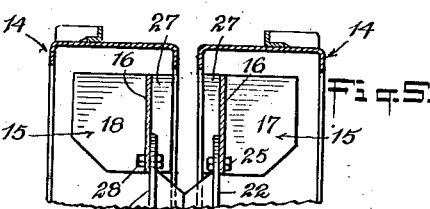
WITNESSES
INVENTOR
Richard C. Wittman
BY
ATTORNEYS Patented May 4, 1943

2,318,550

UNITED STATES PATENT OFFICE 2,318,550

TRACTOR WHEEL ADAPTER

Richard C. Wittman, Emporium, Pa.

Application January 24, 1942, Serial No. 428,051

2 Claims. (Cl. 301—62)

This invention relates to tractor wheels, and more particularly to a method and means for converting or adapting old tractor wheels for use on present-day tractors and for use as extension rims.

While my invention is applicable to any type of tractor, I have shown it as adapted to tractors of the Ford type. Prior to 1927, the Fordson tractor was manufactured. This tractor had metal wheels with metal spokes and the usual metal lugs or grousers. The tractors now manufactured are supplied with disk wheels carrying eight or ten-inch rubber tires. There are many conditions of tillage under which extra traction is useful and for this purpose an extension rim would be highly desirable. Since whenever moving on paved roads the extension rim must be removed, it is advantageous to have the rim one which is easily put on or taken off and which will not be cumbersome nor difficult to handle.

My invention is directed particularly to the adaptation of old tractor wheels to an auxiliary rim, and an object of the invention is to provide means whereby the old wheels may be simply adapted to use either as an extension rim in connection with the present tire or as a wheel on the present machine where tires are not suitable for use or are unobtainable.

A further object is to provide a device of the character described which may be easily and quickly adjusted and which is provided with means for supporting the extension rim and registering it when it is being taken off or put on.

In the accompanying drawing—

Fig. 1 is a perspective view of a tractor of the Ford type with the extension rim in place;

Fig. 2 is a side view of the adapted rim;

Fig. 3 is a cross-sectional view on the line 3—3 of Fig. 2;

Fig. 4 is a perspective view of the adapter;

Fig. 5 shows the use of two rims in place of the tire.

Referring more particularly to the drawing, the tractor tire 10 is mounted on a rim 11 which in turn is supported by a disk 12. This is all standard equipment.

I take the old tractor wheel 14 and cut out the spokes leaving only the rim. I then provide adapters 15. The adapters 15 are each composed of one longitudinal plate member 16 and two transverse plate members 17 and 18. These members are welded together so that they are disposed substantially perpendicular to each other. The members 17 and 18 are therefore parallel to each other and the opposite ends of the member 16 are disposed nearer one end than the other of each of said members 17 and 18. They are then welded into the wheel, the weld extending across the inner face of the wheel at right angles to the vertical weld mentioned. It will be seen that the adapters 15 are welded at 19 and 20 to the inner face of the rim. The member 16 is provided with bolt holes 21 near one edge thereof. In order to apply the rim to the wheel, an additional disk 22 identical with the disk 12 is fastened outwardly to the hub 23 by the same bolts 24 that fasten the disk 12 in place. The rim may then be affixed to the extra disk 22 by means of the bolts 25 fastened through the bolt holes 21. As shown in Fig. 5, the ends of the members 17 and 18 extend beyond the periphery 26 of the disk 22 and this extension 27 is used to support the rim when it is put in place and to center the rim with relation to the disk 22. Normally three adapters would be used, and it will be readily seen that only six bolts 25 need to be operated to apply or remove the rim. Not only do the extensions 27 aid in centering the rim and supporting it when it is being applied, but they also take some of the strain off the bolts 25 when the wheel is in use. The adapter 15 is so placed in the rim that the rim may be used either as an auxiliary wheel or in place of the tire.

As shown in Fig. 5, my adapter rims are used both in place of the tire and as an auxiliary wheel. The adapter 15 is so placed that by reversing the wheel it may be fastened to the disk 12 which supports the tire rim by means of the bolts 28 and can thus be used in place of the tire.

It will be seen that my adapters make it possible to salvage otherwise useless tractor wheels for use either in place of the tire or as an auxiliary wheel. It will also be appreciated that the conversion cost is relatively low and that because of the construction and centering means the rim may be readily removed when the tractor is to be used on paved roads.

I claim:

1. A tractor wheel comprising a rim, a dished disk hub, and means rigidly securing the rim to the hub, said means comprising a plurality of elements arranged in spaced relation to each other, each of said elements consisting of two spaced plates and a connecting plate having the opposite ends thereof rigidly secured to said spaced plates respectively, said spaced plates being disposed parallel to the axis of the rim and rigidly secured to the latter, said third plate being disposed substantially perpendicular to said axis, fasteners securing the connecting plate of each element to said hub, and the circular edge of said hub resting against said spaced plates.

2. An adapter for securing a wheel rim to a hub, said adapter comprising two plates arranged in spaced relation to each other and a connecting plate having its opposite ends secured to said first plates substantially perpendicular thereto nearer one end thereof than the other, said connecting plate having fastener holes near one edge thereof.

RICHARD C. WITTMAN.